United States Patent [19]
Upp

[11] Patent Number: 5,901,146
[45] Date of Patent: May 4, 1999

[54] ASYNCHRONOUS DATA TRANSFER AND SOURCE TRAFFIC CONTROL SYSTEM

[75] Inventor: Daniel C. Upp, Southbury, Conn.

[73] Assignee: TranSwitch Corporation, Shelton, Conn.

[21] Appl. No.: 08/960,499

[22] Filed: Oct. 29, 1997

Related U.S. Application Data

[63] Continuation of application No. 08/213,398, Mar. 14, 1994, which is a continuation-in-part of application No. 08/123,881, Sep. 20, 1993.

[51] Int. Cl.$^6$ .................................................. H04J 3/24
[52] U.S. Cl. ...................... 370/389; 370/458; 370/462; 370/465
[58] Field of Search ...................... 370/389, 420, 370/421, 458, 462, 463, 465, 469, 472, 498, 402, 438

[56] References Cited

U.S. PATENT DOCUMENTS

| | | | |
|---|---|---|---|
| 4,149,144 | 4/1979 | Diefenderfer | 340/147 R |
| 4,156,798 | 5/1979 | Doelz | 179/15 AL |
| 4,375,681 | 3/1983 | Abbott et al. | 370/16 |
| 4,460,993 | 7/1984 | Hampton et al. | 370/84 |
| 4,488,293 | 12/1984 | Haussmann et al. | 370/84 |
| 4,660,169 | 4/1987 | Norgen et al. | 264/900 |
| 4,685,101 | 8/1987 | Segal et al. | 370/84 |
| 4,727,536 | 2/1988 | Reeves et al. | 370/84 |
| 4,750,168 | 6/1988 | Trevitt | 370/85 |
| 4,763,320 | 8/1988 | Rudolph et al. | 370/85 |
| 4,789,926 | 12/1988 | Clarke | 364/200 |
| 4,815,074 | 3/1989 | Jacobsen | 370/112 |
| 4,817,037 | 3/1989 | Hoffman et al. | 364/200 |
| 5,048,012 | 9/1991 | Gulick et al. | 370/472 |
| 5,084,872 | 1/1992 | LeCucq et al. | 370/94.2 |
| 5,163,048 | 11/1992 | Heutink | 370/85.6 |
| 5,172,373 | 12/1992 | Suzuki | 370/85.11 |
| 5,263,023 | 11/1993 | Sevenhans et al. | 370/85.11 |
| 5,276,678 | 1/1994 | Hendrickson et al. | 370/458 |
| 5,299,193 | 3/1994 | Szczepanek | 370/465 |
| 5,572,686 | 11/1996 | Nanziata et al. | 370/462 |

OTHER PUBLICATIONS

Mitel Corporation 1988 Catalog* Table of Contents and pp.4–151, 4–171, an 5–261 through 5–267.
Intel Corporation* 1989 Microprocessor and Peripheral Handbook cover page and pp. 2–222 through 2–240.
PCI Local Bus Specification * Revision 2.0 Apr. 30, 1993.

*Primary Examiner*—Dang Ton
*Assistant Examiner*—Shick Hom
*Attorney, Agent, or Firm*—David P. Gordon; David S. Jacobson; Thomas A. Gallagher

[57] ABSTRACT

An asynchronous data transfer and source traffic control system includes a bus master and a plurality of bus users coupled to a bidirectional data bus. The bus master provides two clock signals to each bus user, a system clock and a frame clock. The frame clock designates the start of a frame. A frame format preferably includes fifteen or sixteen system clock cycles, the first of which is designated the request field and the last of which includes a grant field. One or more other cycles may be assigned control and/or routing information and the remainder of the cycles comprise a data field of fixed length. During the request field, any number of bus users may request access which is received by the bus master. During the grant field, the bus master grants access to a selected bus user for the entire data portion of the next frame. Which user is granted access to the next frame is determined according to an arbitration algorithm in the bus master which may be unknown to the bus users. The asynchronous data transfer and source traffic control system has particular application in accommodating the transfer of the contents of ATM cells used in BISDN systems.

17 Claims, 6 Drawing Sheets

| CLOCK CYCLE | 32 BITS |||||||
|---|---|---|---|---|---|---|---|
| 0 | REQUEST FIELD |||||||
| 1 | INTERNAL ROUTING FIELD (OPTIONAL) |||||||
| 2 | A | B | C | D | VPI | VCI | P T I | C L P |
| 3 | BYTE 3 | BYTE 2 | BYTE 1 | BYTE 0 ||||
| 4 | BYTE 7 | BYTE 6 | BYTE 5 | BYTE 4 ||||
| 5 | BYTE 11 | BYTE 10 | BYTE 9 | BYTE 8 ||||
| 6 | BYTE 15 | BYTE 14 | BYTE 13 | BYTE 12 ||||
| 7 | BYTE 19 | BYTE 18 | BYTE 17 | BYTE 16 ||||
| 8 | BYTE 23 | BYTE 22 | BYTE 21 | BYTE 20 ||||
| 9 | BYTE 27 | BYTE 26 | BYTE 25 | BYTE 24 ||||
| 10 | BYTE 31 | BYTE 30 | BYTE 29 | BYTE 28 ||||
| 11 | BYTE 35 | BYTE 34 | BYTE 33 | BYTE 32 ||||
| 12 | BYTE 39 | BYTE 38 | BYTE 37 | BYTE 36 ||||
| 13 | BYTE 43 | BYTE 42 | BYTE 41 | BYTE 40 ||||
| 14 | BYTE 47 | BYTE 46 | BYTE 45 | BYTE 44 ||||
| 15 | SYSTEM CONTROL | GEN | G | RN | AU | NM | T |

FIG. 3

| Na | Nb | PRIORITY LEVEL OF BUS ACCESS REQUEST |
|---|---|---|
| 0 | 0 | NO ACCESS REQUEST |
| 0 | 1 | LOWEST PRIORITY |
| 1 | 0 | MEDIUM |
| 1 | 1 | HIGHEST ACCESS PRIORITY | ps
ASYNCHRONOUS DATA TRANSFER AND SOURCE TRAFFIC CONTROL SYSTEM

This application is a continuation of Ser. No. 08/213,398 filed Mar. 14, 1994 which is a continuation-in-part of Ser. No. 08/123,881 filed Sep. 20, 1993.

BACKGROUND OF THE INVENTION

1. Field of the Invention

This invention relates generally to asynchronous data communication among a bus master and a plurality of bus users. More particularly, this invention relates to a bus frame and bus structure for an asynchronous data transfer system which allows a bus master to alter the operational characteristics of the bus without the need for altering the operational characteristics of the bus users.

2. State of the Art

Data communication among a bus master and a plurality of bus users is well known in the art. Such communication systems generally include a bidirectional data bus to which the bus master and all of the bus users are connected. The bus master typically produces at least one synchronizing clock signal which is received by all of the bus users on a clock bus separate from the data bus. One data unit which is equal to the bus width can be transferred onto the bus or off the bus during one clock cycle. While all bus users can transfer data off the bus simultaneously, only one bus user can transfer data onto the bus during any given clock cycle. The bus user (which could be the bus master) transferring data onto the bus is said to have "access" or to be "active". In order to determine which bus user is given access during a given clock cycle, an arbitration procedure is established. Typically, each bus user is assigned a time slot in a fixed number of time slots called a data "frame". The frame which defines bus access may be provided with one or more time slots for the exchange of control information in addition to the time slots which are assigned to data transfer. As the clock cycles are received by all of the bus users via the clock bus, each bus user waits for its assigned time slot and then transfers data to the bus during its assigned cycle.

It is recognized that, particularly in asynchronous data transfer systems, bus users are not always ready to transfer data onto the bus during their assigned time slot. Conversely, other bus users may accumulate data for transfer onto the bus faster than their assigned access to the frame will allow them to transfer the data onto the bus. Consequently, it is often desirable to adjust the access mechanism to allow some users relatively more access than others; i.e., more slots in the frame. Many sophisticated algorithms have been developed for arbitrating bus access. However, these known systems typically require that each bus user be aware of the arbitration scheme so that each bus user can tell how much access it has been allocated.

SUMMARY OF THE INVENTION

It is therefore an object of the provide a bus structure and bus frame format for an asynchronous data transfer system which automatically provides adjustable bus access to all bus users.

It is another object of the invention to provide in an asynchronous data transfer system a bus structure and bus frame format which does not require the bus users to be aware of the arbitration scheme used to arbitrate bus access.

It is a further object of the invention to provide in an asynchronous data transfer system an access identification procedure to determine which bus user has access to the bus at any given time.

It is also an object of the invention to provide in an asynchronous data transfer system a bus structure and bus frame format which allows each of the bus users to request access to the bus and the bus master to grant access to the bus.

In accord with these objects which will be discussed in detail below, the asynchronous data transfer system of the present invention includes a bus master and a plurality of bus users which are coupled to a bidirectional data bus and to a clock bus. The clock bus provides to each bus user a system clock and a frame clock. The system clock is the basic transfer clock of the system (i.e., data is put onto the data bus and taken off the data bus during one system clock cycle), while the frame clock designates the start of a frame. A frame format preferably includes sixteen system clock cycles, a first one of which is designated the request field and a last one of which includes a grant field. One or more other cycles may be assigned control and/or routing information and the remainder of the cycles are assigned to the transfer of data from one particular user onto the bus and off the bus to one or more other users. During the first cycle of each bus frame, a number of bus users may request access, which requests are received by the bus master. During the last cycle of each bus frame, the bus master grants access to a selected bus user for the entire data portion of the next frame. Bus users are thus regularly (once each cell) allowed to request access for the next frame and the bus master is regularly (once each frame) granting access to a selected bus user. Which user is granted access to the next frame is determined according to an arbitration algorithm in the bus master which is unknown to the bus users. The arbitration algorithm may thus be changed at any time by the bus master without informing the bus users. Thus, for example, as traffic conditions on the bus change (as different users request more or less access) the arbitration algorithm can be adjusted accordingly by the bus master to provide the most efficient allocation of bus access.

According to an alternate embodiment of the invention, an additional data clock signal is provided on a third clock bus by the bus user which has been granted bus access. This data clock has a higher rate than the system clock and is driven by the granted bus user during the consecutive data transfer portion of the frame. The use of the additional data clock is particularly useful in high speed applications as the clock and data signals are being generated from the same source, and hence skew can be effectively avoided. In order to avoid a possible conflict between signals on the data bus provided by the bus master and the granted bus user, the additional data clock signal driven by the granted bus user is at an increased clock rate (relative to the system clock). This guarantees that the data transfer is completed before the bus master sends its control information onto the data bus.

Additional objects and advantages of the invention will become apparent to those skilled in the art upon reference to the detailed description taken in conjunction with the provided figures.

BRIEF DESCRIPTION OF THE DRAWINGS

FIG. 3 is a chart showing a representative bus frame according to the invention;

DETAILED DESCRIPTION OF THE PREFERRED EMBODIMENTS

Figure 1:
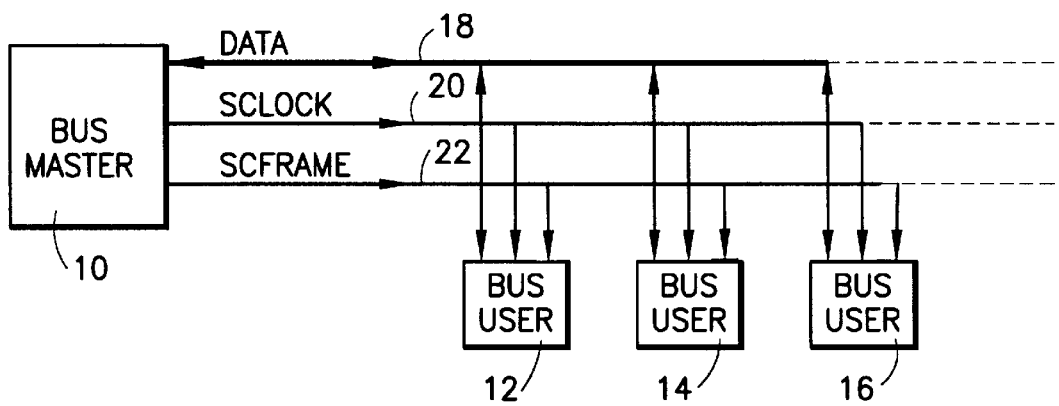
FIG. 1 is a schematic diagram of a first embodiment of the bus structure according to the invention.

Referring now to FIG. 1, a first embodiment of the bus structure of the invention includes a bus master 10 and a plurality of bus users 12, 14, 16 which all are coupled to a bidirectional data bus 18, a system clock bus 20, and a frame clock bus 22. Although only three bus users 12, 14, 16 are shown, it will be appreciated that many bus users can be coupled to the buses 18, 20, 22 as suggested by the dotted lines in FIG. 1. As mentioned above, the data bus 18 is bidirectional to allow any of the bus users 12, 14, 16 and the bus master 10 to transfer data onto or off of the data bus 18. The clock buses 20, 22 are driven by the bus master 10 and are "read only" by all the bus users 12, 14, 16. The data bus 18 is preferably 32-bits wide allowing the transfer of two 16-bit words (4 bytes) during a single cycle of the system clock 20.

Figure 2:
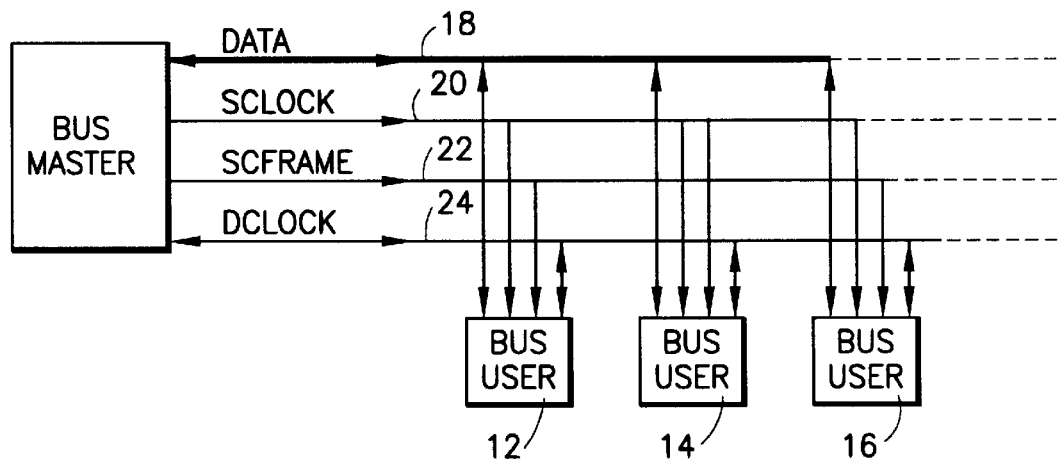
FIG. 2 is a schematic diagram of a second embodiment of the bus structure according to the invention.

According to a second embodiment of the invention which is preferred for high speed applications, the bus structure includes a data clock bus 24 as shown in FIG. 2. The data clock bus 24 is driven by the bus user 12, 14, 16 which is granted access to the data bus, and is read by all of the other bus users 12, 14, 16. As will be discussed in more detail hereinafter, the additional data clock bus 24 is driven at a higher frequency than the system clock bus 20 in order to reduce the variation in delay time between the data driven onto the bus by the granted user and its corresponding clock signal.

In accord with the invention, the structure of the data transfer among bus users 12, 14, 16 or between a bus user and the bus master 10 is accomplished through a bus frame. In the preferred embodiment of the invention, the frame consists of sixteen cycles of the system clock 20. The first cycle of the frame is designated by an active signal on the system frame bus 22. A representative frame according to the invention is shown in FIG. 3.

Before turning to FIG. 3, it should be appreciated that the data transfer format of the bus is designed to accommodate the transfer of the contents of ATM (asynchronous transfer mode) cells used in BISDN (broadband integrated services digital network) systems. The first cycle, driven by the bus users contains the "request" field. The second cycle, driven by one bus user, carries an optional prefix to the ATM cell, which may be used for system-specific purposes, such as an internal cell routing prefix which is used in some ATM switches. The third cycle, driven by the bus user, carries the first four bytes of the ATM cell, containing cell VPI (virtual path indicator) and VCI (virtual circuit indictor) numbering fields, and the PTI (payload type indicator) and CLP (cell loss priority) fields. The next twelve cycles, also driven by the bus user, carry the forty-eight byte ATM cell payload. The final cycle of the bus frame is driven by the bus master, and contains information regarding which user is granted bus access during the next (succeeding) bus frame.

In particular, and as seen in FIG. 3, during the first clock cycle (0) of the frame, bus users transmit a "request" for access to the next following frame. The requests are transmitted by each user having access to one line of the data bus during clock cycle (0) and raising a flag (i.e., placing a "1" on the data bus) if the user is making a request. The combination of the unique request signals from each of, e.g., thirty-two bus users on the data bus results in a double word which indicates which of the bus users are making a request. For example, if there are thirty-two bus users and all are making a request, the double word will contain all "1's". Of course, if some or none of the users have a request, the double word will take a different form. If there are more than thirty-two bus users and the data bus is thirty-two bits wide, different schemes can be utilized to guarantee proper access of the users to the data bus. These schemes are discussed below. It should also be recognized that instead of having access to only one line, each user could access all lines during the request cycle, but that all but the particular line of interest would be set to zero. Since typical bus implementation utilizes open transistor interfaces pulled to a high voltage state for logic zero, writing a one to an assigned line of a user causes a logic one to be asserted on that line as a low voltage level.

Returning to the bus frame format of FIG. 3, a second clock cycle (1) of the frame is optionally provided for an internal cell routing field as discussed above. The third clock cycle (2) of the frame contains the information fields of the ATM cell header as defined by the BISDN standard as set forth above. Based partially on the BISDN standard, the ATM cell header includes either a 4-bit flow control field ABCD with an 8-bit virtual path indicator VPI, a 16-bit virtual channel indicator VCI, a 3-bit payload type indicator, and a single bit indicator CLP (cell loss priority), or a 12-bit VPI, 16 bit VCI, 3-bit PTI and one bit CLP.

The fourth clock cycle (3) through the fifteenth clock cycle (14) of the bus frame contain the ATM cell "payload". Since each clock cycle permits the placement of a double word (32 bits) which is effectively four bytes onto the data bus, the twelve clock cycles permits forty-eight bytes of data to be placed on the bus by that bus user which received the previous grant, i.e. the individual user is granted exclusive access to the data field of the frame in order to transfer a full forty-eight byte ATM cell payload during the data field.

The final clock cycle (15) of the frame contains information from the bus master identifying which bus user will have access to the next following frame. In a system of thirty-two bus users, the bus user having next access to the frame is identified by a five bit grant number (Grant Num). The validity of the grant number is established by a grant enable bit (GEN). In a system of more than thirty-two bus users, additional system control bits will be used to identify page or group number relating to the request field described above.

As mentioned above, different request schemes may be utilized. For example, requests may be paged to accommodate more than thirty-two bus users. In paged requests, the bus master will enable a certain page during the last cycle of each sequential frame and bus users assigned to the enabled page will make requests during the first cycle of the next following frame. A next page will be enabled during the next frame, and so on until all pages have been enabled and the procedure repeats itself. In addition, the request field may be segmented to include both paged requests and direct requests so that bus users having priority do not have to wait to be paged. Alternatively, the direct request segment of the request field can be associated with a page request whereby all of the bus users assigned to a particular page can request that their page be enabled out of turn. Those skilled in the art will appreciate, with the benefit of the disclosure thus far, that many different request fields can be designed to accommodate objects of the invention wherein each bus user independently requests access to the bus as desired.

Figure 4:
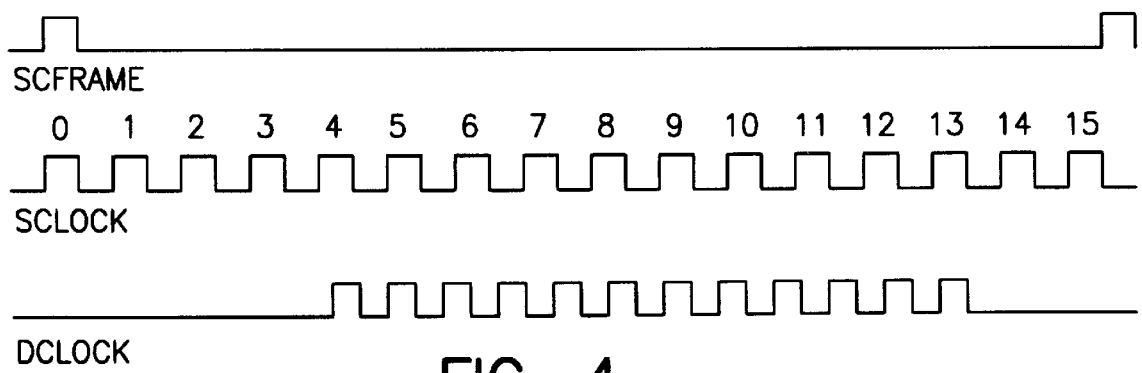
FIG. 4 is a timing diagram showing the three clock signals of the alternate embodiment of the invention.

As mentioned above, the preferred bus frame of the invention is completed in sixteen cycles of the system clock (fifteen if the internal routing field is not utilized) with the frame beginning upon an active signal on the system frame clock bus. FIG. 4 shows a timing diagram illustrating the system cell frame clock bus cycles as compared to the system clock bus cycles. FIG. 4 also shows the cycles of a data clock bus having a higher frequency than the system clock bus in accord with the alternate embodiment of the invention described above with reference to FIG. 2. As seen in FIG. 4, the data clock bus cycles start after the fourth cycle (3) of the frame and continues for twelve cycles at a higher rate that the system clock so that they end before the end of the fifteen cycle (14) of the system clock. In fact, the data clock bus driven by the granted user preferably includes twelve cycles between clock cycles four and thirteen inclusive of the system clock. It will be appreciated from the discussion of the frame above, that it is during these twelve cycles of the data clock bus driven by the granted user that the granted bus user transfers the forty-eight bytes onto the data bus. Using the data clock to drive this forty-eight byte transfer decreases the relative variation between the data on the data bus and its clock signal. In other words, clock/data skew is kept to a minimum. By increasing the data rate of the data clock bus driven by the user, any chance of data collision between ATM cell data provided by the granted user, and the control data placed on the data bus by the bus master is eliminated.

Those skilled in the art will appreciate that during the time between the first cycle of the frame and the last cycle of the frame, the bus master must make a determination as to which bus user will be granted access to the next frame. As mentioned above, it is possible that all of the bus users might request access simultaneously. According to the invention, the requests made by the bus users during the first cycle of the frame are "latched" by the bus master so that the bus users need not repeat requests while waiting to be granted access. Moreover, bus users can register a separate request corresponding to the number of cells-full of data they have to send. Thus, the number of requests registered from each bus user may be used to indicate to the bus master how much data the bus user has to send.

The decision by the bus master to grant access t bus frame is made according to an arbitration algorithm. Any of numerous arbitration algorithms may be utilized and they may, if desired, take into account the amount of data a bus user has to send, the priority given to a particular bus user, the frequency of access requested by a bus user, etc. Moreover, by storing the contents of the request field over time, a processor associated with the bus master can make reasoned decisions as to the granting of access based on recent traffic patterns on the bus. Those skilled in the art will appreciate that the bus users need never be aware of what algorithm is driving the bus master's selection of a bus user's access to the next bus frame. The sequential requesting by bus users and granting by the bus master according to the invention eliminates the need to reconfigure the bus users every time the arbitration procedure is changed. The use of a central bus master with the bus arbitration ability described above enables the rapid change of the operational characteristics of the bus system from a single location without the need to inform any of the bus users.

Examples of bus arbitration algorithms which might be used include a round robin protocol, a modified round robin protocol, a circular priority protocol, a source rate control protocol, etc. In a round robin protocol, bus users are assigned sequential priority numbers and requests are granted in the order of the priority numbers. For example, if bus users 1, 3, 5, and 9 request access during a first frame and bus users 2, 4, and 6 request access in a second frame, they are granted access in the order 1, 2, 3, 4, 5, 6, 9. If, during a third frame, bus user 8 requests access, it will be granted access before bus user 9 is granted access even though bus user 9 was first to request access. After being granted access, the user is placed at the end of the access list. A modified round robin protocol follows the same procedure except that it adds an order of priority based on who requests first. In the above example, access would be granted in the order 1, 3, 5, 9, 2, 4, 6. If, during a third frame, bus user 8 requests access, it is granted access after bus user 6. Again, after being granted access, the user is placed at the end of the access list. The round robin protocol can be implemented using a "circular priority coder" which grants access to bus users according to a predetermined sequential priority. After a bus user has been granted access, it is given the lowest priority and the priority of all other bus users is sequentially advanced one step. Since the bus master alone controls the access of each bus user, any protocol can be used to determine priority of access. As mentioned above, the bus master can consult with bus monitoring devices to exercise a source rate protocol where priority of access is determined according to the number of requests made by each bus user. For example, a bus user which has made frequent requests may be assigned a high priority and a bus user which has made infrequent requests may be assigned a low priority. As the bus activity is monitored, priority assignments can be changed.

Figure 5:
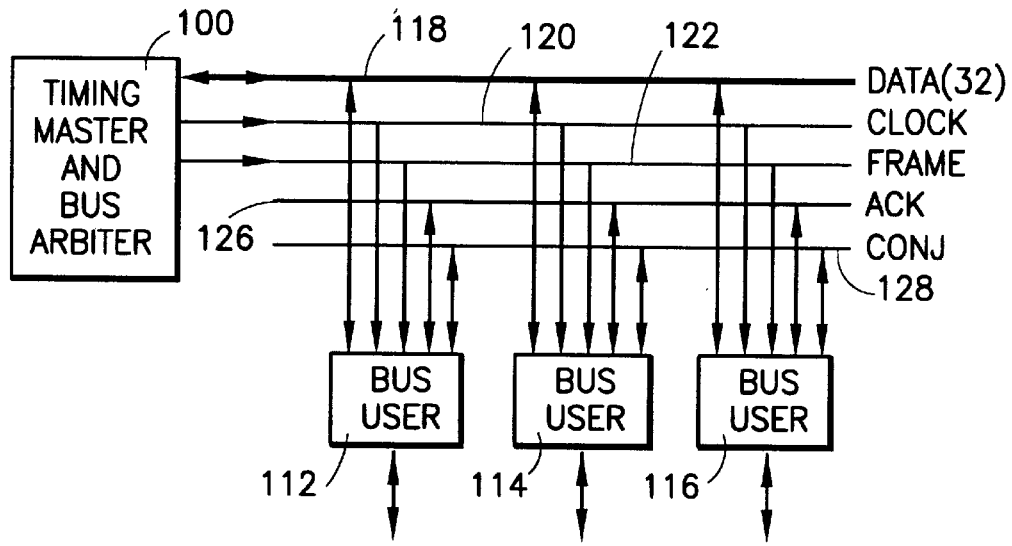
FIG. 5 is a diagram similar to FIG. 1 showing a third embodiment of the invention.

Turning now to FIG. 5, a third embodiment of the invention includes a timing master and bus arbiter 100 and a plurality of users 112, 114, 116 which are coupled to a bidirectional data bus 118, a clock bus 120, and a frame bus 122. The users 112, 114, 116 are also coupled to a bidirectional acknowledge (ACK) bus 126, and a bidirectional congestion (CONJ) bus 128. ATM cells may be transferred from any user to any other user, or to any number of other users (multicast). One user at a time sends a cell to the bus, which may be read from the bus by any user or users. The bus timing master sources the system transfer clock and bus framing signal, both of which are used to synchronize all bus access operations. Bus access is controlled by the bus arbiter. Users request bus access from the bus arbiter. The bus arbiter accepts access requests, queues them as needed, and issues grants. When a grant is issued, it is for one user to send one cell to the bus. All grants are for a single cell time on the bus only. When a user is granted access by the bus arbiter, it will indicate acceptance by asserting the ACK line during the grant phase of the same frame in which the cell was sent. Local conditions at the addressed terminal, such as congestion, may cause an ACK not to be generated. The sending bus user may detect a congested indication at the destination by sensing an asserted CONJ signal on the CONJ line during the grant phase of the same frame in which the cell was sent.

The bus may be implemented on a single card and thus, design uniformity can be maintained. As a result, the operating speed of a single card implementation can be relatively high. For example, a switch fully interconnecting eight SONET/SDH 155.52 MHz lines could be implemented on a single card with a bus operating speed of approximately 48 MHz. The most common physical implementation of the bus is that of multiple plug-in cards in a backplane. This would be the model for most terminal multiplexers or add/drop multiplexers. These systems will, in general, operate at speeds under those attainable in a single-card implementation, since varying loads and backplane effects enter into the design. It is anticipated that SONET/SDH 155.52 and 622.04 MHz add/drop multiplexers or ring structured add/drop multiplexers will be implemented with bus implementations running at or under 30 MHz.

Figure 6:
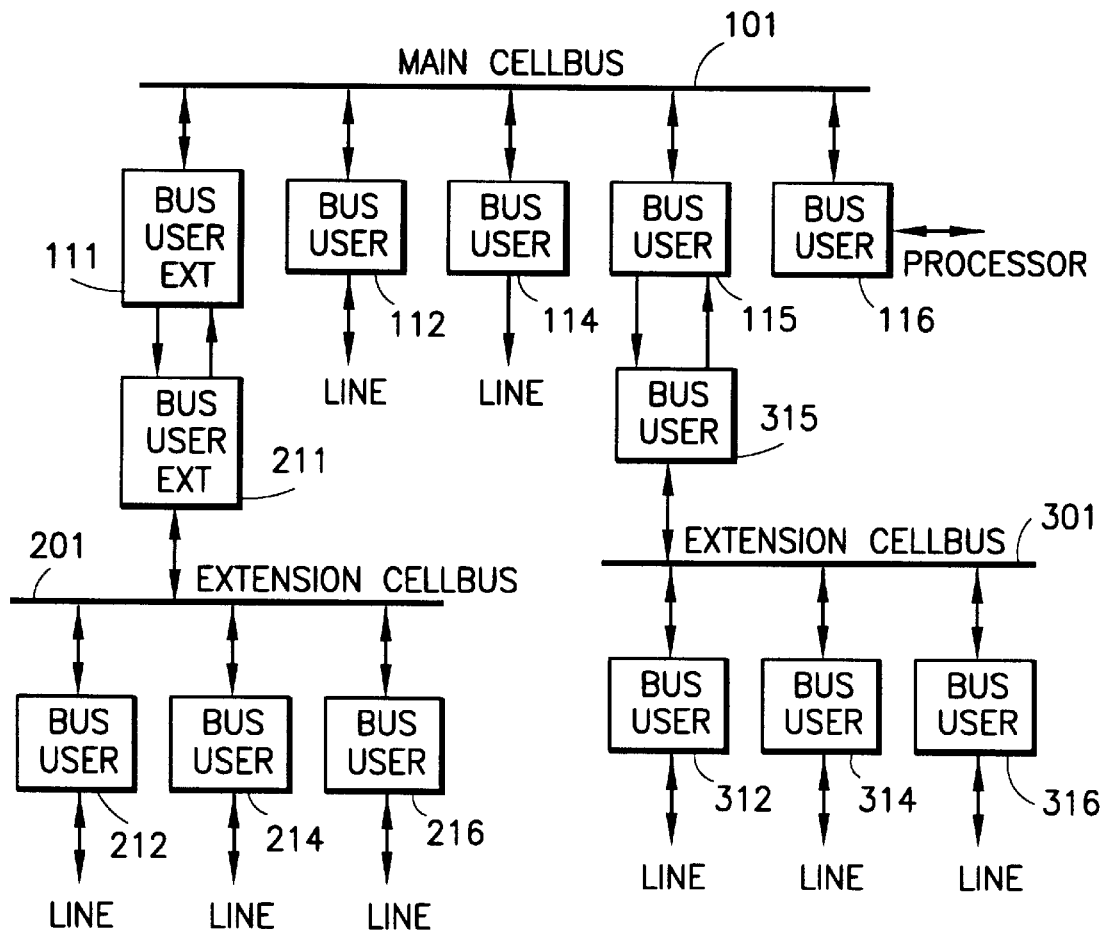
FIG. 6 is a schematic diagram of the structure of bus extensions according to the invention.

One of the main applications of the bus according to the invention is in concentrating traffic from low-rate users up to 155.52 or 622.04 MHz lines, for connection back to an ATM switching system. Particularly for T1 and E1 applications, the number of lines which may be connected to the multiplexer may exceed what is convenient for a single backplane. Therefore, the invention provides for bus extensions such as those shown in FIG. 6. As shown, one bus 101 is used as the main bus segment. Other buses 201, 301 are designated extension segments. Operation of each segment is logically independent of the other segments. That is each segment has its own system clock source, and its own bus arbiter. For example, the clock source and bus arbiter of bus 101 is provided by bus master 100. Similarly, bus 201 is provided with bus master 200, and bus 301 is provided with bus master 300. Bus users may be attached to any bus segment. The connection from an extension bus to the main bus is through two bus users connected back-to-back, one connected to the main bus, the connection between the main bus 101 and the extension bus 201 is through bus users 111 and 211. Similarly, the connection between the main bus 101 and the extension bus 301 is through the bus users 115 and 315. A double-access mechanism is involved in logically connecting the extension busses to the main bus. A user on an extension first requests and then is given access to the extension to which it is connected. The user serving as the connection to the main bus accepts all cells destined for users not connected to that extension bus, and relays them to its connected user on the main bus. This main bus user then requests access to the main bus in order to relay the cell from the extension bus.

Several different cell routing possibilities are supported by the bus structure of the invention. Some routing possibilities and cell addressing modes supporting them are:

| Address Mode | Routing |
| --- | --- |
| Single Address, Data | From any user on any bus segment to any user on any segment |
| Single Address, Control | From the controller of any bus user on any bus segment to the controller of any bus user on any segment |
| Single Address, Loopback | From the controller of any bus user on any bus segment, through any specified bus user back to the controller of the originating bus user on any segment |
| Multiple Address, Data | From any bus user on any bus segment to any set of bus users on any bus segments |
| Multiple Address, Control | From the controller of any bus user on any bus segment to the controllers of any set of bus users on any bus segments |
| Broadcast, Data | From any bus user on any bus segment to all of users on all bus segments |
| Broadcast, Control | From the controller of any bus user on any bus segment to the controllers of all users on all segments |

These possibilities allow for cell communications including user data and bus control information. Specific addressing modes are discussed in detail below.

In any bus system implementation, there is assumed to be at least one system control processor, responsible for overall system operation. In addition, there will probably be individual module processors equipped per user. Thus, the need exists, in general, for some form of intra-system communications between the system processor and the module processors. Bus implementations may either use a separate inter-processor bus for this intra-system communications, or may, if desired, use the bus itself. The cell routing types described above which are of Data type are intended for these system communications and control purposes.

The format of all cells presented to the bus follows a predefined frame such as described above with reference to FIG. 3. In the embodiment of the invention shown in FIGS. 5 and 6, however, a modified cell format such as the one shown in FIG. 7 is desirable.

Figures 7, 8:
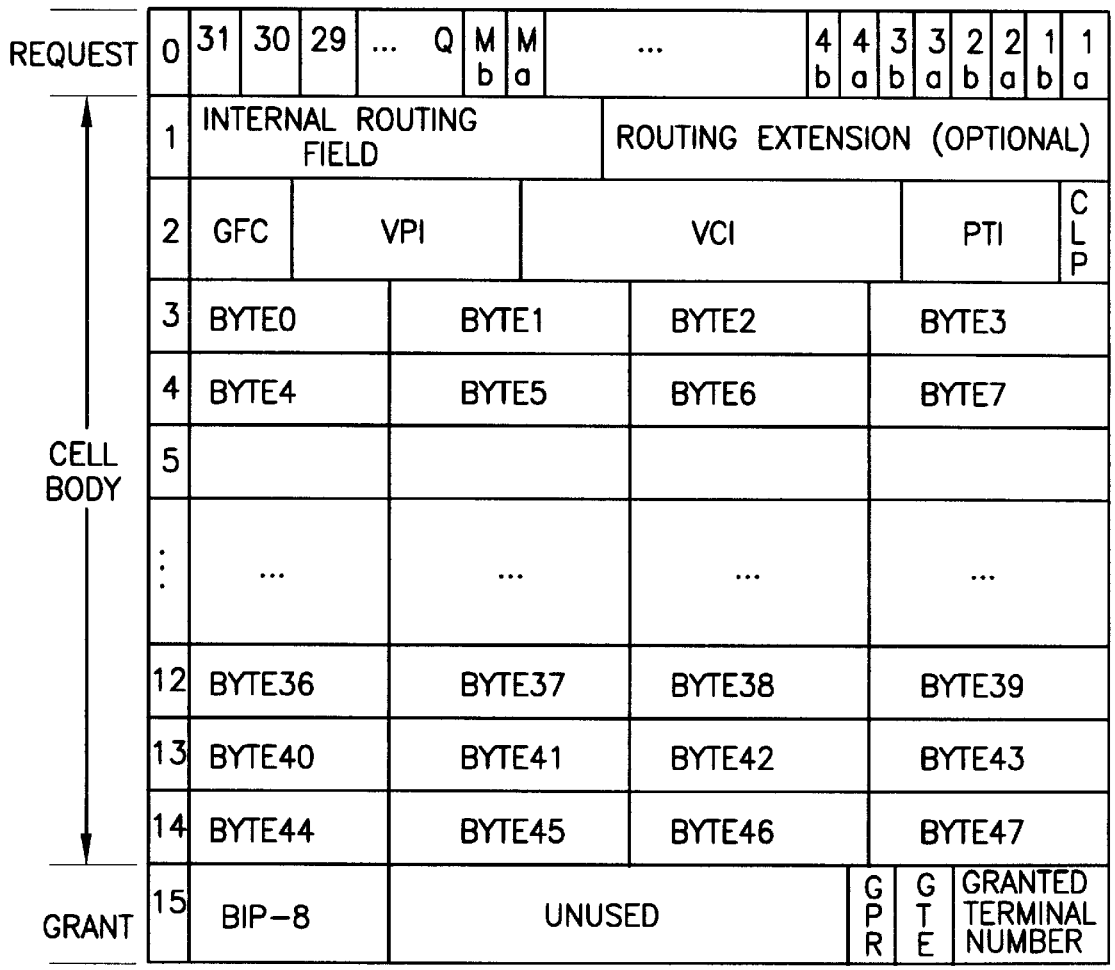
FIG. 7 is a chart similar to FIG. 3 showing a representative bus frame according to the third embodiment of the invention.
FIG. 8 is a chart indicating a format for bus access priority encoding.

As shown in FIG. 7, the format of all cells presented to the bus is a sixteen-cycle structure. One 32-bit word is transferred with each cycle of the system transfer clock. There are three phases to the CellBus cycle: Request, Cell Body, and Grant. During the Request bus cycle, bus users may request access to the bus. Access requests will be made when a user asserts one or two assigned bits on the bus. Each bus user is assigned one or two distinct bit positions in the 32-bit bus word. M users will be assigned two bits on the bus. The remaining 32-2M bit positions assigned to one bit position each. Bus access is controlled by the bus arbiter on the basis of a bus user access request priority. High priority requests are granted bus access before requests with lower priorities. Bus users are divided into two categories: those with dynamically variable bus access priority, and those with fixed bus access priority. Those with dynamically-variable bus access priority will be assigned two bit positions, Nb and Na in the 32-bit field. Up to 16 bus users may be assigned two Request bits. These users will be numbered from 0 through M-1. Assigning two Request bits, Na and Nb to user N allows for that user to request bus access at three different levels of physical access priority, as defined in FIG. 7.

Assignment of bus access priorities to bus users can be done in two ways, depending upon system design needs. The simplest way is to fix the priority assignment by system design. For example, the lower 14 terminals could be assigned variable priority, while the remaining 4 could be assigned fixed priority. Fixed priority users would normally be set at low priority, but the system design could change that. The virtue of fixed assignment is that there is no system configuration phase for bus structure, thus no recovery procedure in case of a system failure or reload. Variable access priority terminals are assigned consecutive numbers from zero up, and fixed access priority terminals are assigned numbers from 31 down. Thus, it is possible for a system controller to interrogate terminals and determine the split between dynamic priority and fixed priority users. By sending a control message, requiring a response, to each number 0 through 31, if only 16 reply, all are variable priority. If all 32 reply, they are all fixed priority. Any split will produce a response by which it is algorithmically possible to determine the number of users in each class.

During the following fourteen bus cycles of each bus frame as shown in FIG. 7, the bus is driven by the user terminal which received a grant to send a cell to the bus. The format of all cells is identical. The first 32-bit word of the Cell Body contains bus routing information and error detection information. The next thirteen bus cycles contain the 52 bytes of the cell being sent to the bus, less the HEC (Header Error Check). The HEC is not carried internally.

The first 32-bit word of the cell body has its upper two bytes containing the bus routing information, along with error protection for this information. This user the cell is to be routed, or will identify it as a broadcast or multicast cell, as described in detail below.

The bus routing information field will be twelve bits wide. In order to ensure correct routing on the bus, the four LSB of the routing field will contain a Hamming code over the upper twelve.

To support applications in which the bus may be a "front-end" to a larger switch, applications in which the switch, itself, may need a routing header, a two byte External Routing Header Extension field is included. These two bytes are optional in usage. If unused, this field is all zeros.

During the following thirteen bus cycles (2 through 14), the header and payload of one cell are sent to the bus by the user which was given access. The four bytes of the header (GFC, VPI, VCI, PTI, and CLP) are aligned into one cycle. Each succeeding cycle (3 through 14) contains four cell payload bytes. Byte alignment of the cell payload bytes is the same as that of the header bytes. That is, the leading bits of the header (GFC) are in the most significant end of the 32-bit bus word, and the leading byte (byte 0) of the cell payload is in the most significant byte position. That is, the format is Big Endian.

During the Grant cycle (15), the bus has a split drive. The cell BIP-8 (bit interleaved parity, described below) is driven as the last byte of the transfer by the granted bus user. The lower seven bits are driven by the bus arbiter. The bus arbiter may issue one grant for one terminal to send one cell to the bus during each Grant cycle. To detect internal bus errors, a bit interleaved parity (BIP) is calculated over the data field from the first External Routing Header byte, through the final data byte. This checksum is generated by the granted bus user, and is checked by the receiving bus user. Upon error, the cell is subject to discard. The five LSB of the Grant word will contain a binary encoded number (0–31) which is the number of the user to which the bus arbiter is issuing a Grant. The MSB is in bit position 4 and the LSB in bit position 0. A Grant Enable bit is set to one whenever a grant is issued to a user. An odd parity check, calculated over the five bits of the Grant field plus the Grant Enable field, is placed in bit 6. This is to protect against bus errors. The remainder of the Grant field is unused, but may be used for general system control purposes or other data extensions to the cell body.

Figure 9:
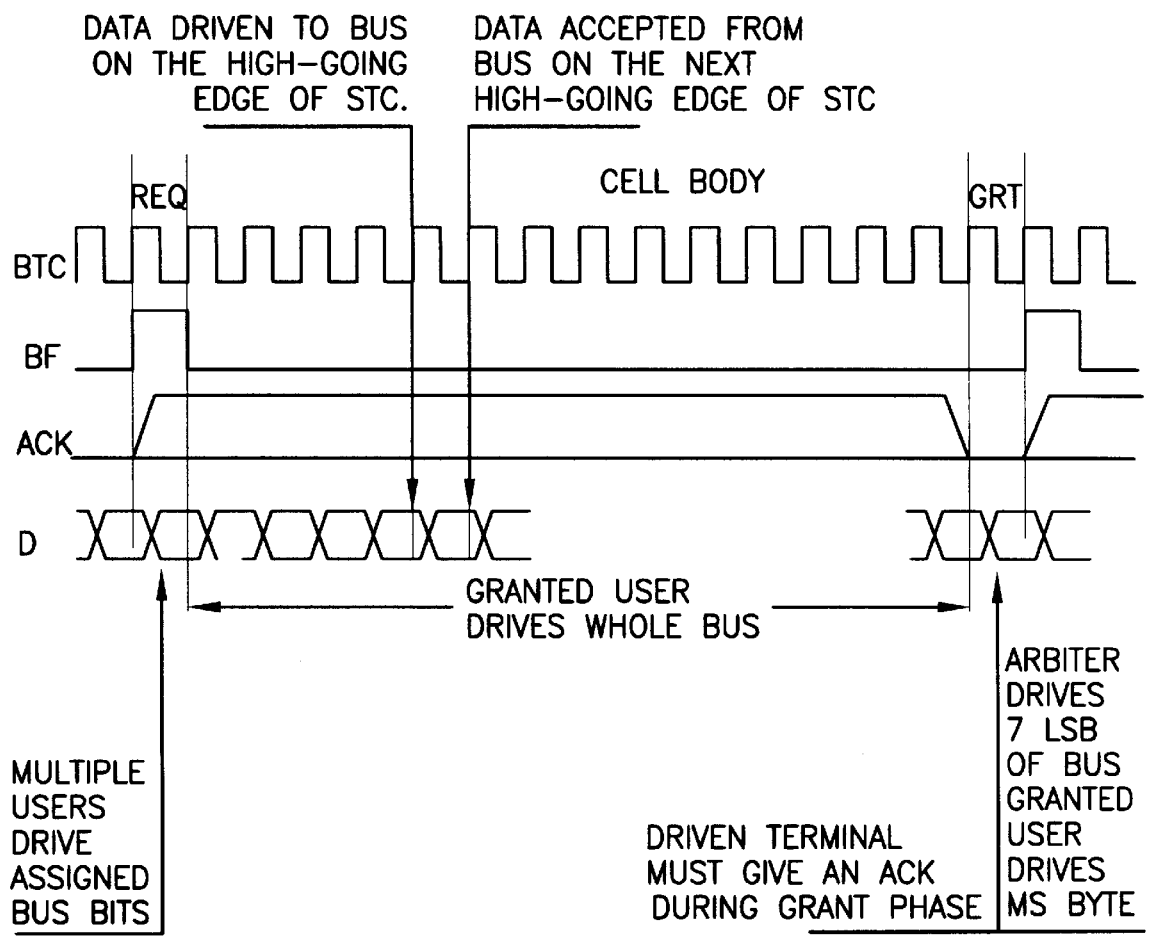
FIG. 9 is a timing diagram showing the four clock signals of the third embodiment of the invention.

FIG. 9 shows a nominal timing diagram illustrating the sequence of operations on the bus with respect to clock edges. Transfers are based on edges of a bus transfer clock (BTC) with one 32-bit word per clock edge. Bus frame time is defined by a frame pulse (BF) occurring once every 16 cycles of the BTC. Data is driven to the bus on one clock edge of BTC and accepted from the bus on the next succeeding same edge of BTC. The bus routing address, along with its error detection field is placed on the bus in the first cycle of the cell body. If the addressed user sees a routing field containing its address, and with no indicated errors, it will indicate cell acceptance by asserting the ACK line during the Grant phase of the current bus cycle. A second optional condition indicator bit, CONJ, is included to allow for the communication back to the sending user of a congestion indication at the destination. The timing of the CONJ signal is identical to that of the ACK signal, during the Grant phase of the same frame in which the cell was sent. An active CONJ is an indication of congestion. An inactive CONJ is no indication. The definition of what condition defines congestion and the consequential actions of an active CONJ indication are unspecified. Preferably, however, a CONJ signal is sent before the bus user is incapable of accepting any more data.

Figure 10:
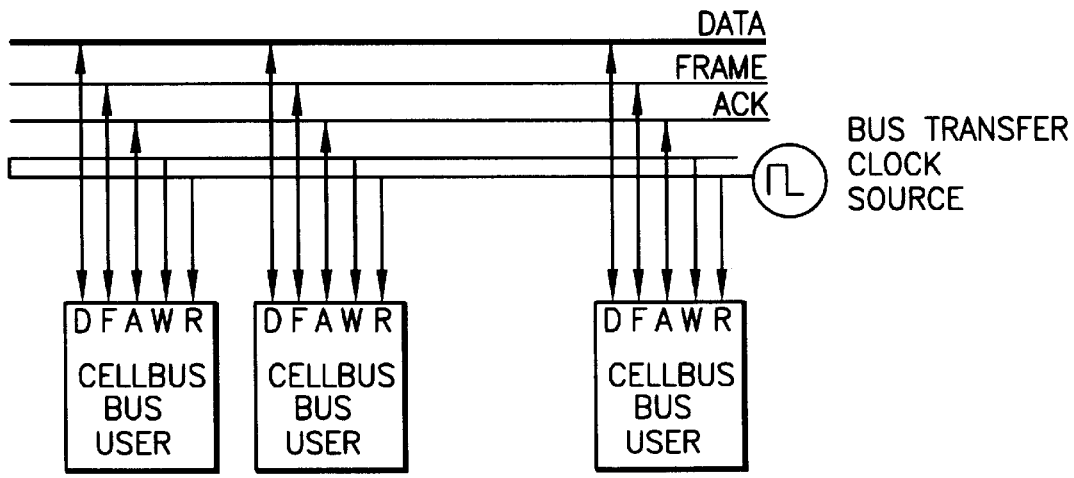
FIG. 10 is a diagram similar to FIG. 5 showing a backplane clock implementation.

For backplane implementations, special clock treatment is defined to allow for data transfers, including the delay effects of the backplane. The source of the Bus Transfer Clock will be physically connected to one end of the bus as shown in FIG. 10. Two Bus Transfer Clock traces will be included in the backplane. These two will be connected at the backplane end opposite from that at which the BTC is connected. Using this configuration, a BTC pulse starts at one end of one clock line, propagates down that trace, "turns around" at the end of that trace, and then propagates back in the direction of the original source. There is a clear, predictable delay associated with the propagation of the clock pulse in this structure. The first line, the one directly connected to the BTC source is used by all bus users as the time at which data is read off of the bus. The second line, the one on the "return" direction is used by all bus users as the time at which data is written onto the bus.

Figure 11A:
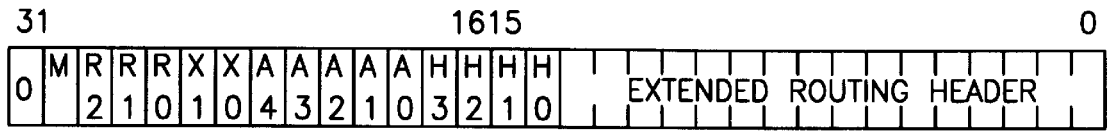
FIGS. 11a through 11g are charts showing various address structures according to the third embodiment of the invention.

As mentioned above, bus addressing supports a number of different modes for both user data cell interconnection as well as for control and diagnostic purposes. Different address structures are shown in FIGS. 11a through 11g. FIG. 11a shows the address structure used for the normal transfer of cells from one user to another which was referred to above as "Single Address, Data." The bus user address (A0 through A4) is a five-bit field for identifying a user on the main bus or an extension bus. A0 is LSB. A three-bit field (R0 through R2) is included to allow for either cell routing in the case of single PHY (physical layer of the ATM BISDN protocol reference model) implementations, or for PHY device selection in the case of multi-PHY implementations. R0 is the LSB. If bit M is set to logic one, a multi-PHY implementation is selected. In this case, the R field is used to address one of eight PHY layer devices. If bit M is set to logic zero, a single PHY implementation is selected, and the R field is used to select into which outlet queue a cell is to be routed. A two bit field (X0–X1) is used for selecting the bus extension number for a user. X0 is LSB. A four bit CRC error check code (H0 through H3) is included for error protection. All unassigned bits of all address structures are set to zero at the source point, and are ignored at all destination points. The subfields R, X, M, and A are all mandatory in the "Single Address, Data" address structure.

Figure 11B:
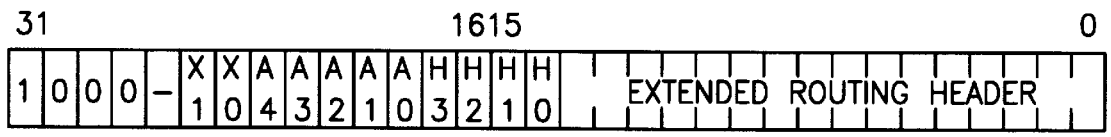

The address structure used to send control cells from one bus user to another single bus user is referred to above as "Single Address, Control" and is shown in FIG. 11b. In this structure, the subfields X and A are mandatory.

Figure 11C:
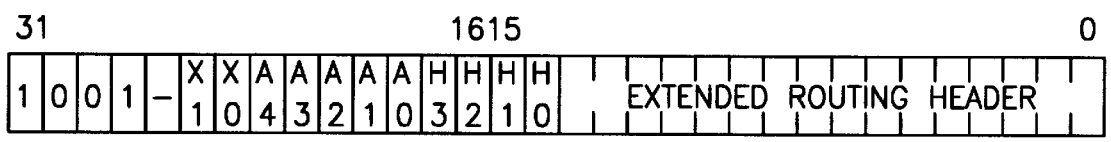

The structure for "Single Address, Loopback" is shown in FIG. 11c. This represents the addressing for a cell arriving at a bus user which has been previously setup to loopback cells to a specified location. In this structure, the fields X and A are mandatory.

Figure 11D:
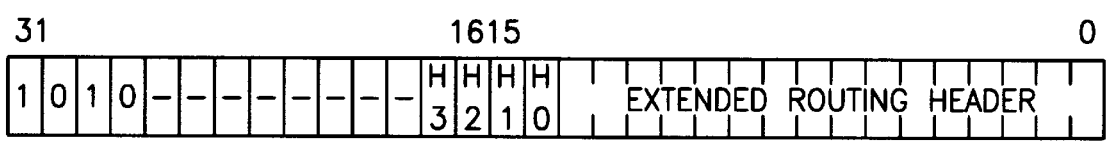

FIG. 11d shows the structure used to distinguish cells which are to be accepted by all users, "Broadcast Address, Data". In this structure, there are no mandatory fields beyond the cell type coding.

Figure 11E:
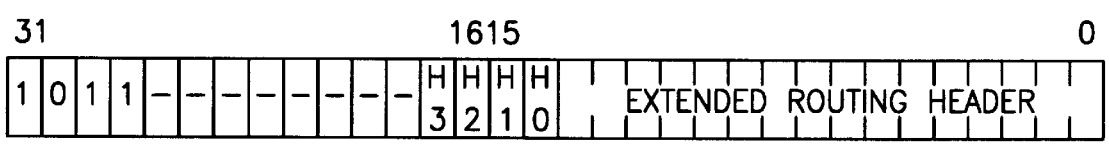

"Broadcast Address, Control" address structure is shown in FIG. 11e. This address structure is used to distinguish cells which are to be accepted by the controllers of all users. There are no mandatory fields beyond the cell type coding.

Figure 11F:
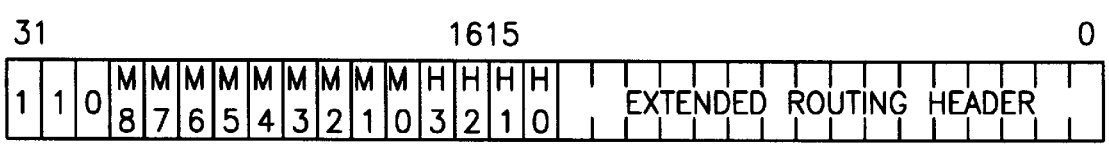
Figure 11G:
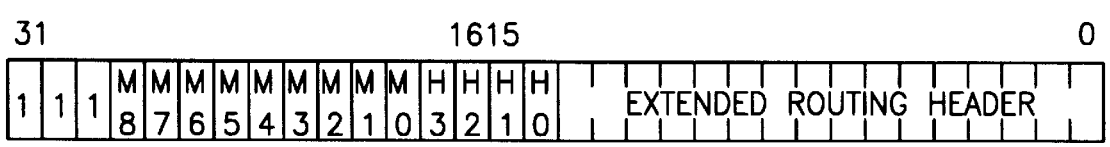

For "Multicast Address, Data" and "Multicast Address, Control", shown in FIGS. 11f and 11g, a nine bit field (M0 through M8) is used to distinguish cells associated with different multicast sessions. M0 is LSB and the M subfield is mandatory in this address structure.

The sequence of operations on a bus according to the invention is fixed. The Request cycle is the first in a bus transfer frame. During the Request cycle, any or all of the bus users on a main or extension bus may make requests for bus access. A bus access request is made by a bus user that has a cell to be sent, and is made by that user asserting its assigned request bit or bits during the Request bus cycle. The electrical technologies used will all be of "open-drain" type technology, so asserting a request bit means that the user will "pull-down" its bit or bits during the Request cycle. Those bus users having only fixed access priority, and thus a one-bit request field assignment, will assert the assigned bit if a cell is ready to be sent. Those bus users having two request bits assigned, and are thus of variable priority, will assert either one or two bits during the Request cycle, the level of priority depending upon operating conditions.

A bus user defined as variable priority may still make all requests at one level of priority. Two examples are a high traffic user and a low traffic user. The high traffic user might make all requests at high priority, so as to avoid inlet queueing, while the low traffic terminal might make all requests at low priority, since it can afford to wait somewhat on service. Alternately a user can dynamically decide, based on instantaneous measurements of its own internal conditions, or on other factors, to change its access priority. For example, the level of priority might be increased by a user if the depth of its inlet queue exceeds some limit. The bus will allow both mechanisms to coexist, provided only that the bus arbiter know which bus users are of fixed priority, what that priority is, and which bus users are of dynamic priority.

During the fourteen cycles of the cell body phase of the frame, the user having received the current grant will drive a cell to the bus. The user will drive all fourteen cycles, in the order defined by FIG. 7, and with all fields complete; The final cycle of the frame is the Grant cycle, during which the bus arbiter gives access to the bus for one specific user for one cell. The bus access grant which the bus arbiter gives during a grant cycle is for the immediately next cell body. That is, the cell body which starts on the second clock cycle following the grant cycle. The immediately next cycle following the Grant cycle is the next Request cycle, the following one, the first of the next succeeding cell body.

There have been described and illustrated herein several embodiments of an asynchronous data transfer and source traffic control system. While particular embodiments of the invention have been described, it is not intended that the invention be limited thereto, as it is intended that the invention be as broad in scope as the art will allow and that the specification be read likewise. Thus, a bus frame width of thirty-two bits has been disclosed, it will be appreciated that other frame configurations could be utilized. Likewise, while the preferred number of cycles of the frame is sixteen, a fifteen cycle frame could also be utilized without departing from the concepts of the invention. Also, while three specific clock buses have been shown, it will be recognized that other types of clock buses could be used with similar results obtained. Moreover, while particular formats have been disclosed in reference to the request field, it will be appreciated that other formats could be used as well. Furthermore, while particular formats have been disclosed in reference to the grant field, it will be appreciated that other formats could be used as well to achieve the same or similar function as disclosed herein. It will therefore be appreciated by those skilled in the art that yet other modifications could be made to the provided invention without deviating from its spirit and scope as so claimed.

I claim:

1. An asynchronous data transfer and source traffic control system, comprising:
    a) a first bidirectional data bus;
    b) a first clock bus having a first clock signal of a first frequency;
    c) a first bus master bidirectionally coupled to said first bidirectional data bus and coupled to said first clock bus;
    d) a first acknowledge bus; and
    e) a plurality of first bus users bidirectionally coupled to said first bidirectional data bus and said acknowledge bus, and coupled to said first clock bus and receiving said first clock signal, wherein
        said plurality of first bus users make requests for write access to said first bidirectional data bus during a request field of a repeating data bus frame and are individually granted write access to said first bidirectional data bus by said first bus master during a grant field of said repeating data bus frame,
        said repeating data bus frame comprising a predetermined number of cycles of said first clock signal, said predetermined number of cycles defining said request field, an asynchronous transfer mode data field, and said grant field,
        one of said requests made in said request field of a first iteration of said repeating data bus frame being granted in said grant field of said first iteration of said repeating data bus frame for exclusive write access during said asynchronous transfer mode data field of a second iteration of said repeating data bus frame, and
        an individual first bus user which is granted access asserts the acknowledge bus during the grant field of said second iteration of said repeating data bus frame.

2. A system according to claim 1, wherein:
said request field comprises a first plurality of bits, each of said first plurality of bits corresponding to one of said plurality of first bus users and requests are made by said plurality of first bus users by asserting their respective bits during said request field.

3. A system according to claim 2, wherein:
said request field comprises a second plurality of bits, each of said second plurality of bits corresponding to a respective one of at least some of said plurality of first bus users and said at least some of said plurality of first bus users make a request by asserting one or both of their respective bits, priority of access being determined by said first bus master according to which of said bits are asserted.

4. A system according to claim 1, wherein:
each of said plurality of first bus users has an address, and the address of a destination bus user is written to said first bidirectional data bus by one of an origination bus user and said first bus master during a routing field of said repeating data bus frame.

5. A system according to claim 4, further comprising:
f) a congestion first bus, each of said plurality of bus users being bidirectionally coupled to said congestion bus, wherein
    an asserted congestion bus during the grant field by said destination bus user indicates a congested condition of said destination bus user.

6. A system according to claim 4, further comprising:
f) a second bidirectional data bus;
g) a second clock bus having a second clock signal;
h) a second bus master bidirectionally coupled to said second bidirectional data bus and coupled to said second clock bus; and
i) a plurality of second bus users bidirectionally coupled to said second bidirectional data bus and coupled to said second clock bus, one of said second bus users being bidirectionally coupled to one of said first bus users, wherein
    said plurality of second bus users make requests for write access to said second bidirectional data bus during a request field of a repeating second data bus frame and are individually granted write access to said second bidirectional data bus by said second bus master.

7. A system according to claim 4, wherein:
said routing field includes a plurality of bits corresponding to one of single address routing, multiple address routing, and broadcast routing.

8. An asynchronous data transfer and source traffic control system, comprising:
    a) a first bidirectional data bus;
    b) a first clock bus having a first clock signal of a first frequency;
    c) a first bus master bidirectionally coupled to said first bidirectional data bus and coupled to said first clock bus; and d) a plurality of first bus users bidirectionally coupled to said first bidirectional data bus, and coupled to said first clock bus and receiving said first clock signal, wherein said plurality of first bus users make requests for write access to said first bidirectional data bus during a request field of a repeating data bus frame and are individually granted write access to said first bidirectional data bus by said first bus master during a grant field of said repeating data bus frame, said repeating data bus frame comprising a predetermined number of cycles of said first clock signal, said predetermined number of cycles defining said request field, an asynchronous transfer mode data field, and said grant field, one of said requests made in said request field of a first iteration of said repeating data bus frame being granted in said grant field of said first iteration of said repeating data bus frame for exclusive write access during said asynchronous transfer mode data field of a second iteration of said repeating data bus frame, said request field comprises a first plurality of bits and a second plurality of bits, each of said first plurality of bits corresponding to one of said plurality of first bus users and requests are made by said plurality of first bus users by asserting their respective bits during said request field, each of said second plurality of bits corresponding to a respective one of at least some of said plurality of first bus users and said at least some of said plurality of first bus users make a request by asserting one or both of their respective bits, priority of access being determined by said first bus master according to which of said bit s are asserted.

9. A system according to claim 8, wherein:

each of said plurality of first bus users has an address, and the address of a destination bus user is written to said first bidirectional data bus by one of an origination bus user and said first bus master during a routing field of said repeating data bus frame.

10. A system according to claim 9, wherein:

said routing field includes a plurality of bits corresponding to one of single address routing, multiple address routing, and broadcast routing.

11. A system according to claim 9, further comprising:

e) a congestion first bus, each of said plurality of bus users being bidirectionally coupled to said congestion bus, wherein
an asserted congestion bus during the grant field by said destination bus user indicates a congested condition of said destination bus user.

12. An asynchronous data transfer and source traffic control system, comprising:

a) a first bidirectional data bus;

b) a first clock bus having a first clock signal of a first frequency;

c) a first bus master bidirectionally coupled to said first bidirectional data bus and coupled to said first clock bus;

d) a plurality of first bus users bidirectionally coupled to said first bidirectional data bus, and coupled to said first clock bus and receiving said first clock signal;

e) a second bidirectional data bus;

f) a second clock bus having a second clock signal;

g) a second bus master bidirectionally coupled to said second bidirectional data bus and coupled to said second clock bus; and h) a plurality of second bus users bidirectionally coupled to said second bidirectional data bus and coupled to said second clock bus, one of said second bus users being bidirectionally coupled to one of said first bus users, wherein
said plurality of first bus users make requests for write access to said first bidirectional data bus during a request field of a repeating data bus frame and are individually granted write access to said first bidirectional data bus by said first bus master during a grant field of said repeating data bus frame,
said repeating data bus frame comprising a predetermined number of cycles of said first clock signal, said predetermined number of cycles defining said request field, an asynchronous transfer mode data field, and said grant field,
one of said requests made in said request field of a first iteration of said repeating data bus frame being granted in said grant field of said first iteration of said repeating data bus frame for exclusive write access during said asynchronous transfer mode data field of a second iteration of said repeating data bus frame, and
said plurality of second bus users make requests for write access to said second bidirectional data bus during a request field of a repeating second data bus frame and are individually granted write access to said second bidirectional data bus by said second bus master.

13. A system according to claim 12, wherein:

each of said plurality of first bus users has an address, and the address of a destination bus user is written to said first bidirectional data bus by one of a first bus user and said first bus master during a routing field of said repeating data bus frame.

14. A system according to claim 13, wherein:

each of said plurality of second bus users has an address, and the address of a destination bus user is written to said second bidirectional data bus by one of a second bus user and said second bus master during a routing field of said second repeating data bus frame.

15. A system according to claim 13, wherein:

said routing field includes a plurality of bits corresponding to one of single address routing, multiple address routing, and broadcast routing.

16. A system according to claim 13, further comprising:

i) a first congestion bus, each of said plurality of first bus users being bidirectionally coupled to said first congestion bus, wherein
an asserted first congestion bus during the grant field by said destination bus user indicates a congested condition of said destination bus user.

17. A system according to claim 16, further comprising:

j) a second congestion bus, each of said plurality of second bus users being bidirectionally coupled to said second congestion bus, wherein
an asserted second congestion bus during the grant field by said destination bus user indicates a congested condition of said destination bus user.

* * * * *